United States Patent
Povar et al.

(10) Patent No.: US 12,153,188 B2
(45) Date of Patent: Nov. 26, 2024

(54) MICRO-WEATHER REPORT CAPTURE BY UNMANNED AERIAL SYSTEM (UAS) DEPLOYMENT

(71) Applicant: INTERNATIONAL BUSINESS MACHINES CORPORATION, Armonk, NY (US)

(72) Inventors: Victor Povar, Vancouver (CA); Martin G. Keen, Cary, NC (US); John Handy Bosma, Leander, TX (US); Paul P. Giangarra, Spicewood, TX (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 16/174,098

(22) Filed: Oct. 29, 2018

(65) Prior Publication Data
US 2020/0132883 A1 Apr. 30, 2020

(51) Int. Cl.
*G01W 1/08* (2006.01)

(52) U.S. Cl.
CPC .................... *G01W 1/08* (2013.01)

(58) Field of Classification Search
CPC ........................................ G01W 1/08
See application file for complete search history.

(56) References Cited

U.S. PATENT DOCUMENTS

| | | | |
|---|---|---|---|
| 8,818,705 B2 | 8/2014 | Spata | |
| 8,903,568 B1 * | 12/2014 | Wang | G05D 1/0038 701/2 |
| 9,087,451 B1 | 7/2015 | Jarrell | |
| 9,334,052 B2 | 5/2016 | Pasko | |
| 9,594,372 B1 | 3/2017 | Sills et al. | |
| 9,665,094 B1 * | 5/2017 | Russell | G01P 5/00 |
| 9,959,771 B1 | 5/2018 | Carlson | |
| 9,977,963 B1 * | 5/2018 | Fendell | G05D 1/0011 |
| 10,502,584 B1 * | 12/2019 | Suiter | G08G 5/0069 |
| 2004/0244476 A1 * | 12/2004 | Andrews | G01W 1/10 73/170.01 |
| 2009/0210109 A1 * | 8/2009 | Ravenscroft | G01C 21/20 701/25 |
| 2009/0326792 A1 * | 12/2009 | McGrath | G01W 1/08 701/4 |

(Continued)

FOREIGN PATENT DOCUMENTS

EP    2525243 A1 * 11/2012 ............. F03D 80/00

OTHER PUBLICATIONS

Black, "The Future of Drone Delivery Hinges on Predicting the Weather Block by Block," https://www.bloomberg.com/news/articles/2017-06-21/the-future-of-drone-delivery-hinges-on-predicting-the-weather-block-by-block, Jun. 21, 2017 (5 pages).

*Primary Examiner* — Lina Cordero
*Assistant Examiner* — Lyudmila Zaykova-Feldman
(74) *Attorney, Agent, or Firm* — Daniel J Blabolil

(57) ABSTRACT

Embodiments for capturing a micro-weather report by a UAS deployment by one or more processors are described. Micro-weather conditions at a selected location and altitude may be determined utilizing one or more sensor devices associated with the UAS. The collected micro-weather conditions data may be stored in a repository. A micro-weather report may be generated for the selected location and altitude according to the collected micro-weather conditions data stored in the repository.

14 Claims, 7 Drawing Sheets

(56) References Cited

U.S. PATENT DOCUMENTS

| | | | |
|---|---|---|---|
| 2014/0324351 A1* | 10/2014 | Dannevik | G08B 21/10 |
| | | | 702/3 |
| 2014/0343765 A1* | 11/2014 | Suiter | G08G 5/0021 |
| | | | 701/18 |
| 2015/0336668 A1* | 11/2015 | Pasko | B64C 39/024 |
| | | | 701/2 |
| 2015/0370300 A1 | 12/2015 | Luo | |
| 2016/0189101 A1 | 6/2016 | Kantor | |
| 2016/0217694 A1* | 7/2016 | Batla | H04L 67/34 |
| 2016/0244163 A1* | 8/2016 | Peeters | G05D 1/104 |
| 2016/0253908 A1* | 9/2016 | Chambers | G08G 5/006 |
| | | | 701/2 |
| 2016/0370800 A1* | 12/2016 | Chau | G05D 1/0088 |
| 2017/0069214 A1* | 3/2017 | Dupray | G08G 5/0008 |
| 2017/0177006 A1* | 6/2017 | Fisher | B64D 47/08 |
| 2017/0263133 A1* | 9/2017 | Blomberg | G08G 5/0039 |
| 2017/0345319 A1* | 11/2017 | Wang | G08G 5/0056 |
| 2018/0002017 A1* | 1/2018 | Abeles | B64C 39/024 |
| 2018/0020081 A1* | 1/2018 | Teague | B64C 39/024 |
| 2018/0024271 A1* | 1/2018 | Koch | G01W 1/14 |
| | | | 702/3 |
| 2018/0350246 A1* | 12/2018 | Burgess | H04L 67/52 |
| 2018/0357908 A1* | 12/2018 | Shorter, Jr. | G06F 9/451 |
| 2018/0364714 A1* | 12/2018 | Anderson | B64C 39/024 |
| 2019/0088145 A1* | 3/2019 | Chambers | G08G 5/0034 |
| 2019/0154874 A1* | 5/2019 | Shams | B64C 1/0009 |
| 2019/0187168 A1* | 6/2019 | Mukai | G01P 13/002 |
| 2020/0250993 A1* | 8/2020 | Li | G08G 5/0091 |
| 2021/0065566 A1* | 3/2021 | Li | H04W 4/50 |
| 2021/0070440 A1* | 3/2021 | Abeles | B64F 5/60 |

\* cited by examiner

MICRO-WEATHER REPORT CAPTURE BY UNMANNED AERIAL SYSTEM (UAS) DEPLOYMENT

BACKGROUND OF THE INVENTION

Field of the Invention

The present invention relates in general to computing systems, and more particularly, to various embodiments for micro-weather report capture by unmanned aerial system (UAS) deployment at selected locations and altitudes.

Description of the Related Art

The use of drones, such as unmanned aerial vehicles (UASs), has become increasingly prevalent in recent years. For example, drones are becoming increasingly popular in the hobbyist/consumer market. Interest in the commercial use of drones is also increasing, as new regulations in the U.S. are being crafted to enable commercial drone flights. Industries that drones may impact may include agriculture, environmental, cinematography, mining, oil and gas, emergency response, and law enforcement.

SUMMARY OF THE INVENTION

Various embodiments for micro-weather report capture by unmanned aerial system (UAS) deployment by one or more processors are described. In one embodiment, by way of example only, a method for capturing micro-weather reports by unmanned aerial vehicle (UAS) deployment, again by one or more processors, is provided. Micro-weather conditions at a selected location and altitude may be determined utilizing one or more sensor devices associated with the UAS. The collected micro-weather conditions data may be stored in a repository. A micro-weather report may be generated for the selected location and altitude according to the collected micro-weather conditions data stored in the repository.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
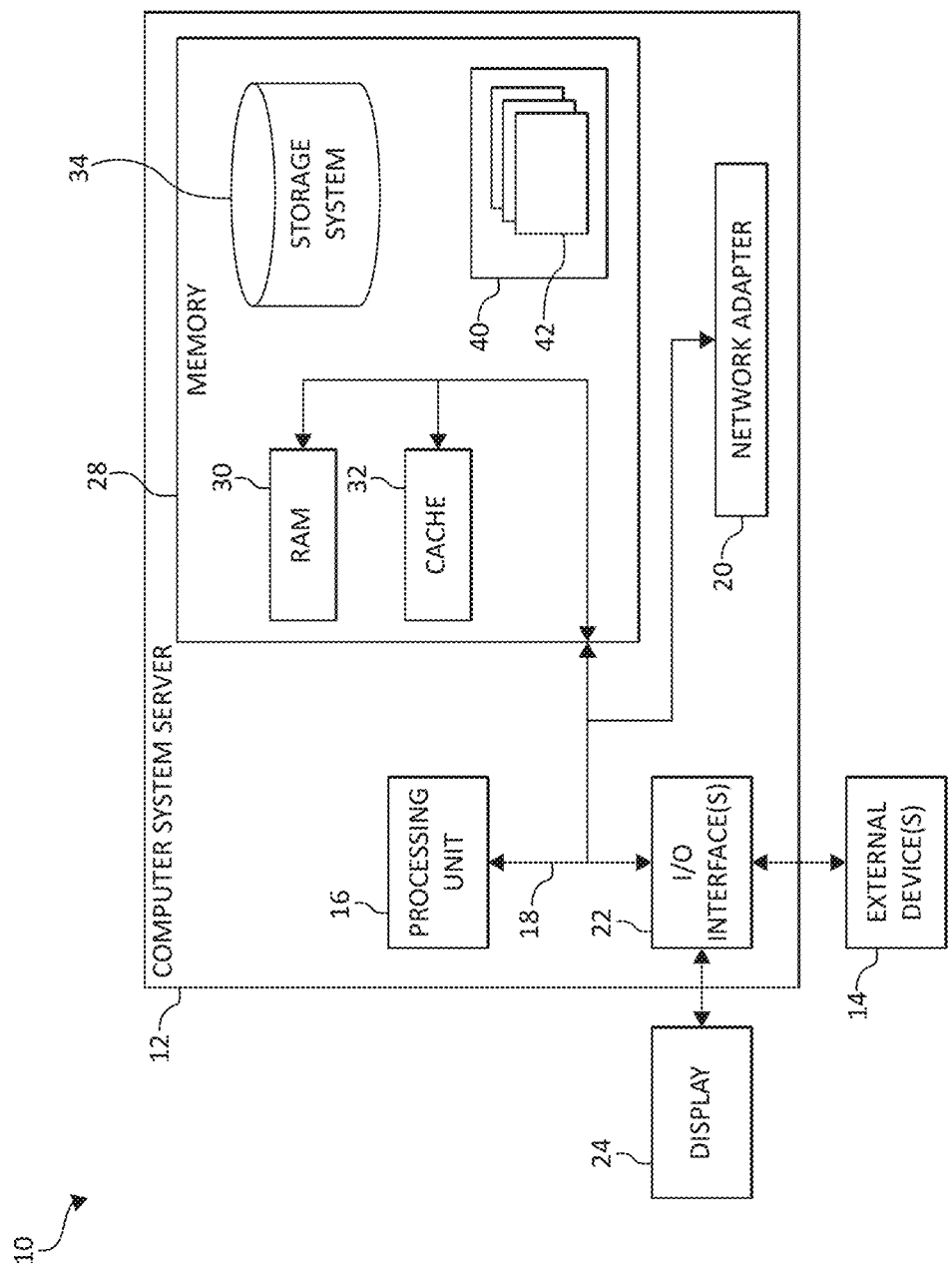
FIG. 1 is a block diagram depicting an exemplary computing node according to an embodiment of the present invention.

As previously indicated, the use of drones, such as an unmanned aerial system (UAS), has become increasingly prevalent in recent years. Drones are small, lightweight aerial vehicles that are operated either autonomously by onboard computers or by a human operator via remote control. For autonomous flight, drones contain a global positioning system (GPS) device that guides them along a sequence of waypoints and enables them to return to their launching point. Drones may carry payloads, such as sensor packages, cameras, or other types of small objects.

Consider an example in which a UAS is scheduled to deliver an item (e.g., a product ordered through a website) to a delivery point (e.g., a residence). It may be foreseeable that under many circumstances, the delivery process may be carried out in a relatively simple, straightforward manner (e.g., dropping the item on a front porch of the residence) without any particular parameters or restrictions concerning the operation of the UAS during the delivery process (e.g., time of delivery, altitude during flight, exact drop off location, etc.). However, various conditions or circumstances may arise within one or more areas surrounding the delivery point that may make the delivery more difficult or undesirable. Thus, it becomes necessary that the UAS operate using particular parameters or restrictions during the delivery process.

For example, weather conditions may develop in the area, which make the delivery relatively high risk with respect to potential damage to the UAS or item during the delivery process (e.g., high winds) and/or damage to the item after being delivered at the delivery point (e.g., water damage from precipitation). As another example, the delivery point may be located within an area in which multiple drones (e.g., other drones) are operating, which may pose a potential threat of damage to the drones or the item(s) due to collisions. Further, if the delivery point happens to be in an area that is experiencing an unusual amount of ground traffic (e.g., from vehicles and/or pedestrians) around the time the delivery is to take place, there may be an increased threat of injury to ground traffic and/or UAS itself in the event that the UAS is damaged before, during, and/or after the delivery takes place. Particularly concerning is that such circumstances or conditions may arise only after the UAS has been scheduled to make the delivery, or even while the UAS is en route to the delivery point.

As such, having an awareness or knowledge of weather conditions is essential to the safety of the UAS and individuals within a flight path of the UAS, particularly for a defined region along various points of a flight path. For example, a micro-weather report relates to the current weather at a specific location and altitude may assist with increasing the safety of the ground traffic or the drone. It should be noted that micro-weather or "micro-climate" may refer to a local set of atmospheric conditions that differ from those in the surrounding areas with either a slight difference or a substantial difference. The term micro-weather or "micro-climate" may refer to a defined area (e.g., defined location and altitude) such as, for example, a few square meters or square feet (e.g., few square meters on the $10^{th}$ floor of an apartment building) or as large as many square kilometers or square miles (e.g., a street within a city). For example, a micro-weather reports may include: 1) a micro weather report outside the 10th floor of Building X facing north, 2) a micro weather report at 200 ft at global positioning satellite ("GPS") co-ordinates X, Y.

Such specific micro-weather reports are difficult to generate today. Broader weather reports (such as the temperature, wind speed, and precipitation in a large city) provide a baseline, but fail to actually describe the micro-weather conditions at a selected location (the 10th floor of Building "X") and/or a selected altitude (e.g., 200 ft above the ground), and/or the weather on a street surrounded by large skyscrapers/buildings of a city where wind tunnels may form. To further illustrate, consider, for example, a UAS dispatched to deliver packages to a person's front door or balcony in a high rise building. Knowing the micro-weather for these locations can determine if it is safe to deliver a package. Thus, a need exists for micro-weather report generation for one or more UASs. Such knowledge may then be used to determine a level of safety for the parcel delivery such as, for example, determining a maximum weight of package that may be safely delivered given the current micro-weather conditions.

Accordingly, the present invention provides for generation of a micro-weather report for a specific location and altitude through analysis of one or more UAS/UAS sensors. One or more UASs may be dispatched to the specific location and altitude to capture micro-weather data when the current data for a given location and altitude falls below a defined quality threshold.

In some embodiments, the present invention provides for generating micro-weather reports using a drone (e.g., UAS), again by one or more processors. Micro-weather conditions at a selected location and altitude may be determined utilizing one or more sensor devices associated with the drone. The collected micro-weather conditions data may be stored in a repository. A micro-weather report may be generated for the selected location and altitude according to the collected micro-weather conditions data stored in the repository.

The drone may be controlled such that the drone operates in the selected area based on the changed set of operating parameters. In some embodiments, the drone is an unmanned aerial vehicle (UAS). However, it should be noted that the methods and systems described herein may (also) be used with ground based vehicles, such as unmanned ground vehicles (UGVs), and watercraft, such as unmanned surface vehicles (USVs).

In an additional aspect, a UAS may be scheduled to operate in a defined/selected area. The detecting of the micro-weather condition related to the operation of the UAS in the selected area may occur before, during, and/or after the scheduling of the UAS to operate in the selected area. The detecting of the micro-weather condition related to the operation of the UAS in the selected area may occur while the drone is traveling within the selected area. As such, the detecting of the micro-weather condition and/or the changing (or initiating) of the UAS operating parameters may be performed in "real-time" or "dynamically" to optimize the overall performance and/or efficiency of the drone systems to increase ground and UAS safety.

In an additional aspect, the present invention provides for automatically generating a micro-weather report against specific location/altitude by capturing weather data with a UAS. Micro-weather conditions (e.g., precipitation, temperature, wind speed, wind direction etc.) may be collected/captured at the specific location/altitude by utilizing multiple sensors and storing the collected micro-weather details in a central micro-weather repository for generating the micro-weather report. Accuracy of the micro-weather report may be increased based on various operations such as, for example, by 1) deploying a new UAS, 2) issuing a request to nearby manually controlled UAS, and/or 3) modifying of mission for nearby autonomous UAS.

For example, a delivery operation of a drone be used to enable a certification process to allow drones to fly into one or more residential or commercial neighborhoods that contain skyscraper/high-rise buildings and prevent drones from crashing into each other and into the skyscraper/high-rise building when the drones encounter different weather conditions (e.g., different micro-weather conditions) even within small areas such as, for example, when the drone exits from a shadow of a building and flies into a potential wind tunnel and/or another hazardous micro-weather condition that is significantly different as compared to other locations and/or altitudes.

Thus, the present invention may provide the different micro-weather conditions for each location and altitude to the appropriate drone, enabling the drone to make the necessary corrections when encountering (or prior to encountering) the micro-weather condition changes. The micro-weather condition information may be specific to a geographical position and altitude. For example, currently weather information is only provided at ground level and at 35,000 feet, and the present invention may fill in the gap between those 2 points, specifically above ground and up to and around the height of a skyscraper/high-rise building (e.g., at least up to 10,000 feet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors therein) is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in, for example, drones (e.g., UASs) or computing systems that controlling drones and/or establish drone operating parameters (e.g., an aircraft control tower, military installation, etc). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
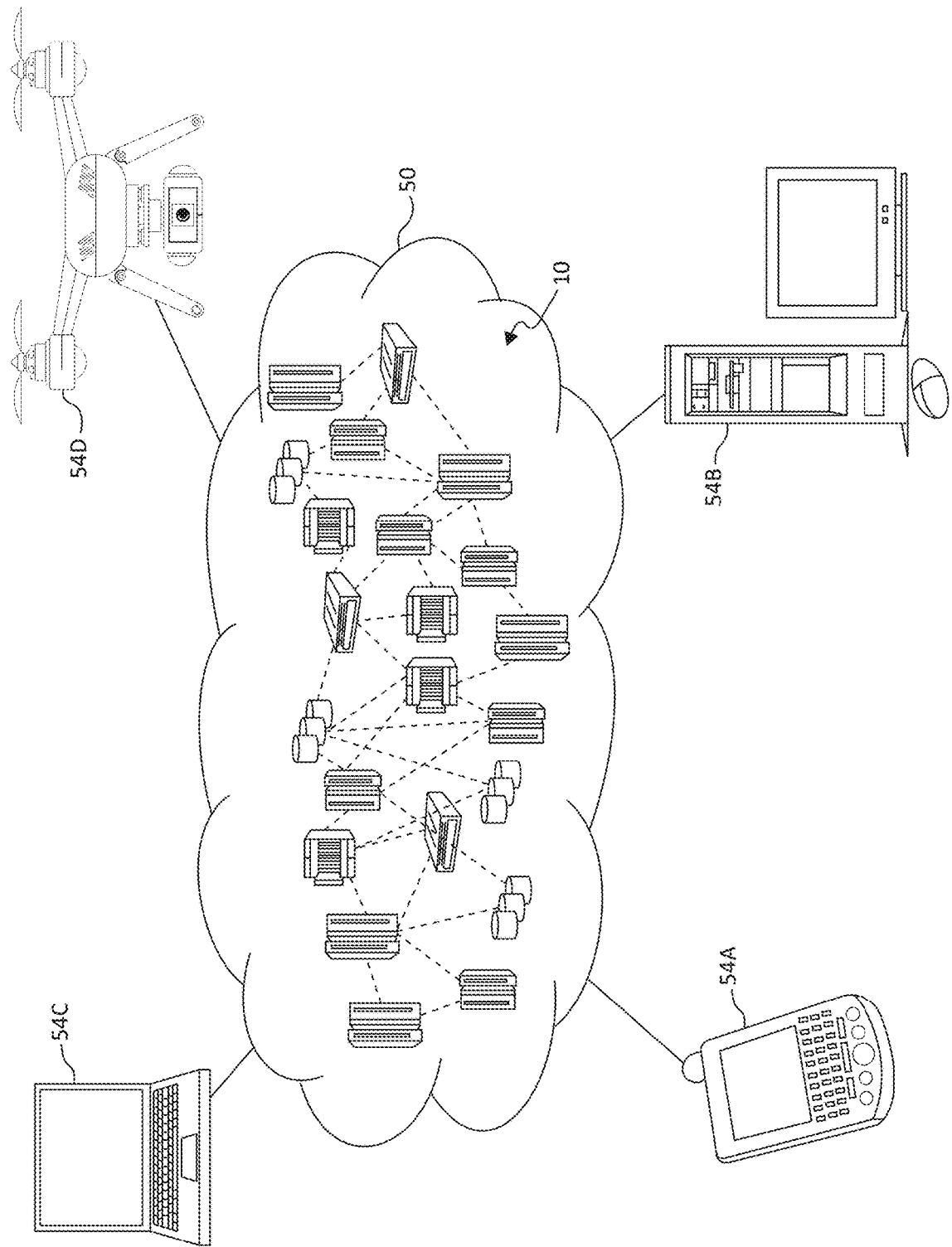
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and drone management computer systems, such as, for example, those in drones 54D (and/or drone control systems), may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
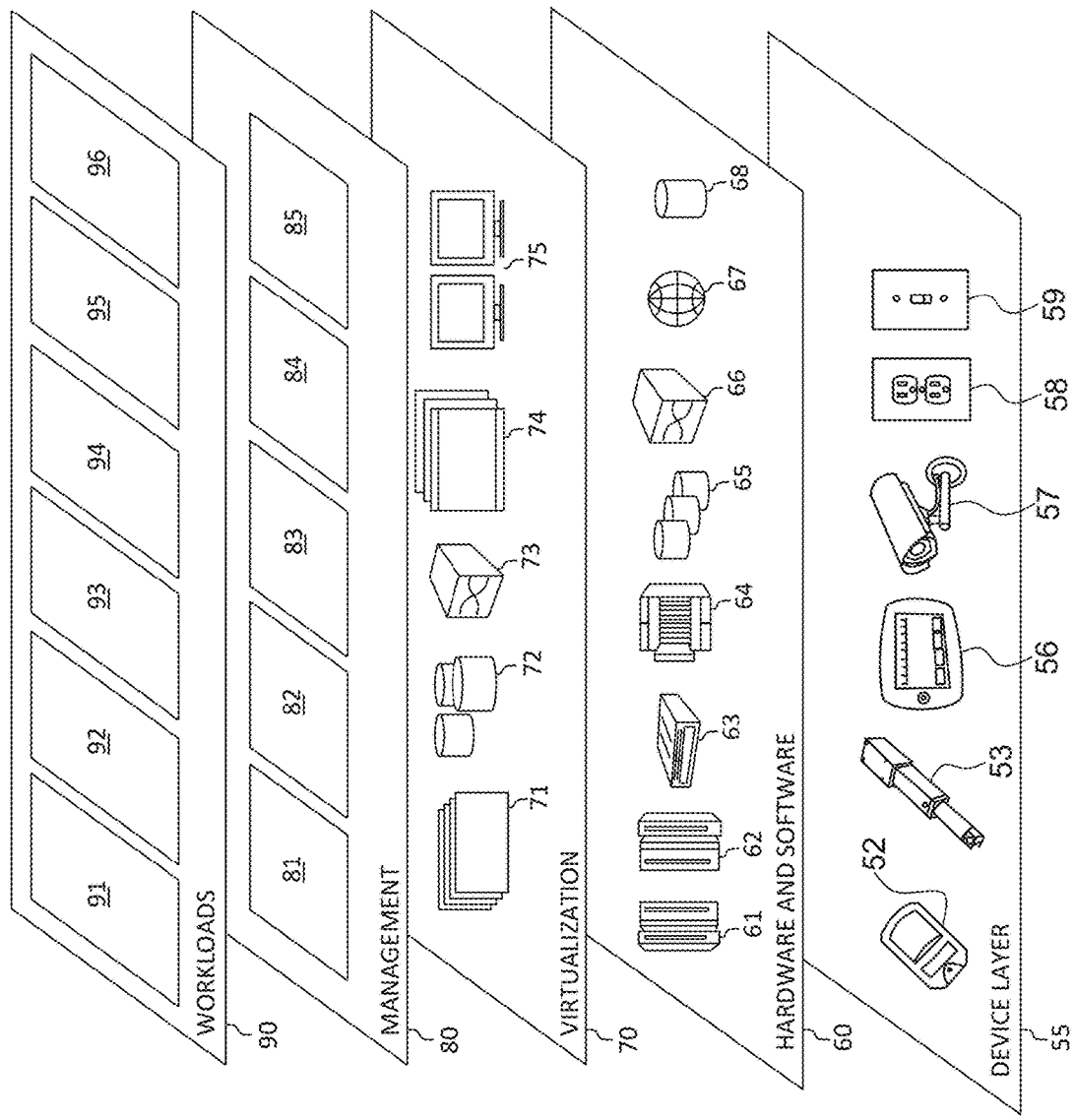
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to drones (e.g., UASs), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for generating micro-weather reports using drones as described herein. One of ordinary skill in the art will appreciate that the workloads and functions 96 for generating micro-weather reports using drones may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for generating micro-weather reports using drones, such as when traveling in, or near, a selected location and altitude. The methods and systems may include a data collection aspect, where a variety of micro-weather information may be collected. Additionally, the information may include, for example, the current date/season and weather data (e.g., temperature, chance of participation, etc.) associated with the region(s) in which the drones are to travel.

More specifically, the present invention may utilize one or more sensors on a UAS, such as wind-compensating motor speed, to derive the micro-weather conditions at a specific location and altitude where the UAS is located. The collected micro-weather conditions may be stored in a central repository. The present invention may deploy one or more UAS's to a selected area to increase the accuracy of a micro-weather report through three operations: 1) deploying one or more new UAS, 2) sending a request to one or more nearby manually controlled UAS, and/or 3) modifying a mission and/or flight path/delivery schedule for one or more nearby autonomous UAS.

Figure 4:
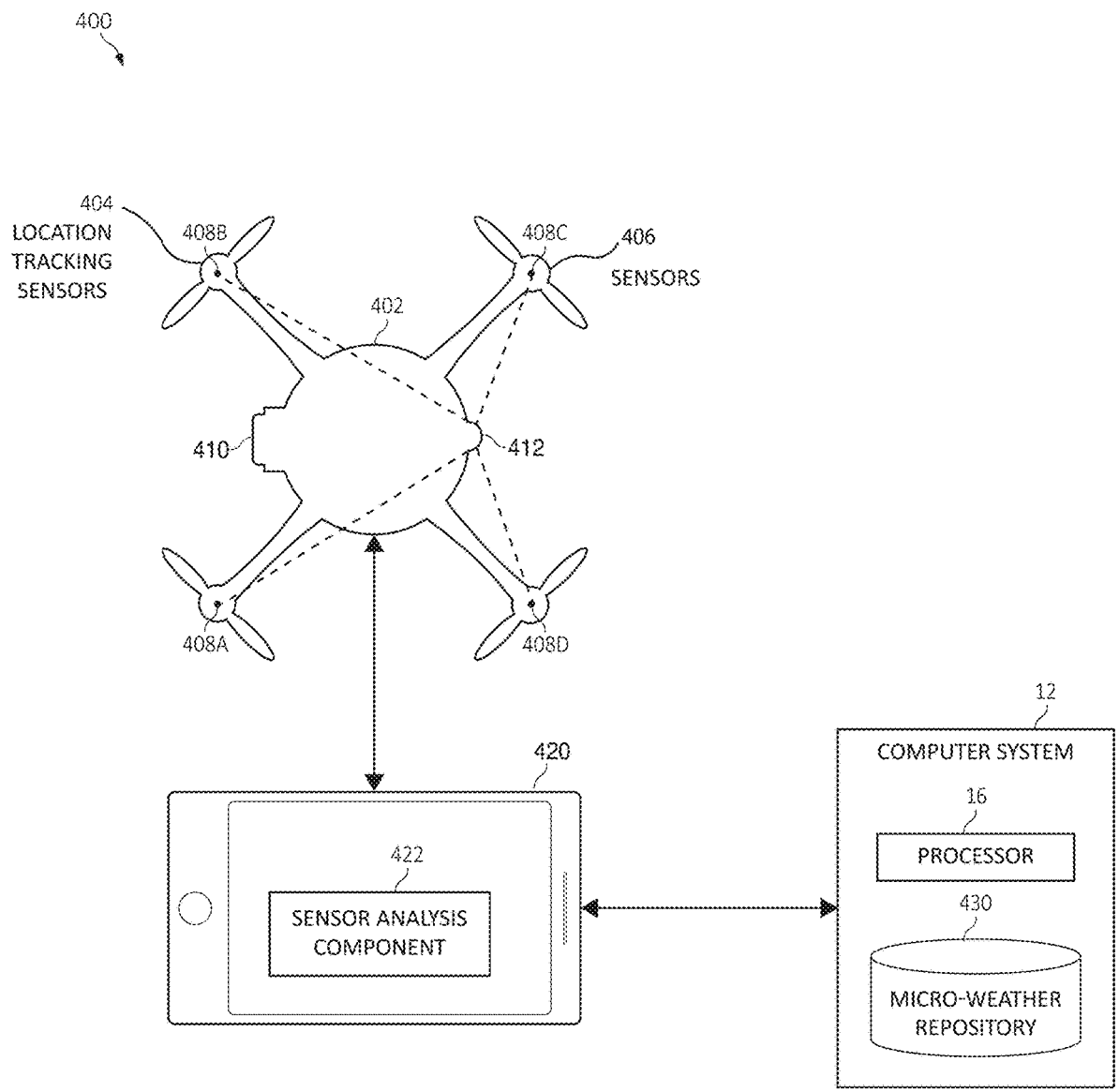
FIG. 4 is an additional block diagram depicting various aspects of functionality in accordance with some embodiments of the present invention.

Referring to FIG. 4, a block diagram illustrates certain aspects of functionality, or a (computing) system 400 for real-time sensor data and positional data collection from a UAS that is analyzed to derive micro-weather, according to some embodiments of the present invention. The system 400 includes a drone 402 (e.g., an UAS), a user equipment 420 (e.g., an Internet of Things "IoT" device, computer, laptop, smart phone, smart watch, etc.) with the UE 402 having a sensor analysis component 422. The drone 402 and the computing device 420 may include and/or be in communication with computer system 12 (see FIG. 1) having a processor unit 16 (e.g., processor) and a repository 430 (e.g., a micro-weather repository). In one aspect, the sensor analysis component 422 may be located external to the UE and located on the computer system 12.

In operation, the system 400 may perform one or more operations or "stages" for capturing a micro-weather report by a UAS deployment.

Stage 1: Collection of drone sensor data

In one aspect, the drone 402 may be connected to the UE 420 to facilitate communication between the drone 402 device and a user of the drone 402. As the drone 402 flies/moves, the drone 402 may track a precise location and position using one or more sensors such as, for example sensors 404 and/or 406 (e.g., location tracking sensors). For example, sensors 406 (e.g., location tracking sensors) may perform one or more location tracking operations such as, for example, satellite positioning (e.g., GPS and/or Global Navigation Satellite System "GLONASS") to derive current location co-ordinates and/or one or more barometric sensor to derive altitude.

One or more on-board sensors such as, for example, sensors 404 and/or 406 may detect factors that affect active flight of the drone 402 such as, for example, wind resistance. As the drone 402 encounters differing levels of wind resistance, an Electronic Speed Controller (ESC) board (not shown for illustrative convenience) of the drone 402 may adjust a level of thrust to one or more rotors (e.g., rotors 408A-D) to maintain/keep the drone 402 on a selected course/route. By calculating wind resistance, the sensor analysis component 422 may derive an approximate wind speed and/or wind direction. In an additional aspect, the drone 402 may be equipped with additional sensors such as, for example, sensors 410 and/or 412. For example, sensor 410 may be a camera that may perform an image analysis to derive visual weather conditions such as, for example, various levels and types of precipitation (e.g., rain, sleet, snow, hail). Sensor 412, for example, may be a thermometer (e.g., a digital thermometer) that may determine a current temperature at a selected location and position of the drone 402.

The sensor data and correlated positional data (GPS coordinates and altitude) of the drone 402 may be communicated (e.g., streamed back) to the UE 420 for processing by the sensor analysis component 422. The sensor analysis component 422 may use the sensor data to derive data such as, for example, current location and altitude, wind speed, wind direction, precipitation type, precipitation strength, temperature, and/or other data capable of being measured/detected by one or more sensors. The derived data of micro-weather conditions in a specific location may be stored in the repository 430 (e.g., a micro-weather repository).

Stage 2: User requests micro-weather report

Turning now to stage 2, a user may issue one or more request to the system 400 (e.g., a request sent to the computer system 12) for a micro-weather report to view current weather conditions in a selected area/region. That is, the micro-weather report may be specific to a particular location (GPS coordinates) and altitude.

Stage 3: Analysis of quality of micro-weather data for a given location

To produce a reliable report of micro-weather in a given location, the computer system 12 may correlate multiple weather reports stored in the repository 430 as captured by the drone 402 (e.g., sensors 404, 406, 410, and/or 412) and analyzed by the UE 420/sensor analysis component 422.

For a new micro-weather report request, the computer system 12 may analyze the amount and quality of data available in a given area. If the repository 430 (e.g., a micro-weather repository) has data that is equal to or greater than a quality threshold and/or time period (e.g., at least 3 weather reports of wind speed as captured by three different drones in the past 20 minutes), a micro-weather report may be generated and provided to the requesting user. (See stage 5). If the quality of data for a requested location is less than/below the quality threshold (e.g., an insufficient amount or not enough data has been captured), the computer system 12 may initiates Stage 4.

Stage 4: Deployment of UAS's to capture additional micro-weather data

Stage 4 may be invoked/initiated when a user has requested current micro-weather conditions in a particular area (e.g., defined location and altitude), and insufficient data is available to meet this request in the micro-weather repository. The computer system 12 may initiate one or more requests to deploy one or more drones to an area specified in the micro-weather report request.

Figure 5:
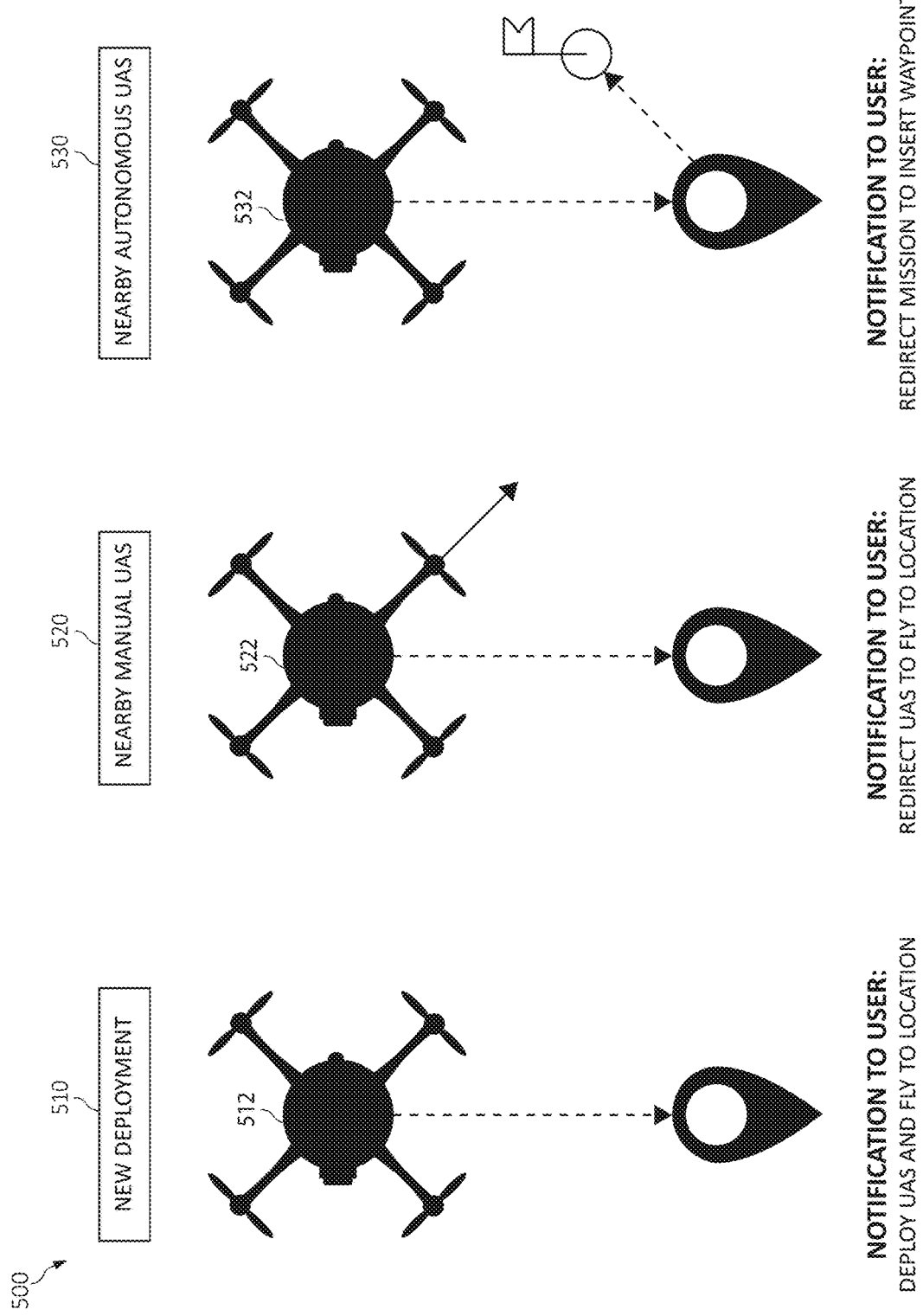
FIG. 5 is an additional block diagram illustrating an unmanned aerial system (UAS) redirected to capture sensor data to derive micro-weather conditions in accordance with some embodiments of the present invention.

For example, as illustrated in FIG. 5, one or more drones (e.g., one or more UAS) may be redirected to capture sensor data to derive micro-weather conditions (e.g., according to the current micro-weather conditions request). As depicted in operation 510 (e.g., new deployment"), a request may be issued to locate a nearby UAS 512 and dispatch the UAS 512 to the requested area to capture sensor data. For example, if an organization has a fleet of UASs nearby, one or more UASs can be dispatched.

As depicted in operation 520 (e.g., nearby manual UAS), a request to one or more nearby manually-controlled UASs may be issued. The computer system 12 of FIG. 4 may detect the location of one or more registered UASs (e.g., UAS 522) that are currently flying nearby (e.g., nearby to computer system 12 and/or within a defined distance to a selected location and altitude for acquiring micro-weather condition data), using a repository such as, for example, a UAS Traffic Management repository (e.g., available from an outside/external source). A request may be generated to an operator of the UAS to fly the UAS to the location and/or altitude specified and capture sensor data of the area to collect micro-weather conditions/data.

As depicted in operation 530 (e.g., nearby autonomous UAS"), a request to nearby autonomously-controlled UASs may be issued. The computer system 12 of FIG. 4 may detect the location of one more registered UASs (e.g., UAS 530) currently flying (or imminently due to fly/travel) a pre-programmed autonomous mission (e.g., a mission to deliver a package/parcel). If the autonomous mission passes nearby (e.g., within a define distance) the requested location, the mission of the one or more UAS may be modified to detour via the requested location to capture sensor data of the area (e.g., to collect micro-weather conditions/data).

The sensor data, captured from these operations/methods 510, 520, and/or 530, may be analyzed to derive micro-weather conditions and stored in the repository 430 of FIG. 4. The computer system 12 of FIG. 4 may analyze the accuracy of the sensor data measurements from multiple UASs in a given micro-climate for consistency to derive accuracy (e.g., the more consistent the readings from multiple UAS, the more accurate the data is considered to be).

Stage 5: Micro-weather report generated for user

When the repository contains a sufficient amount (e.g., a defined amount) of recent data that is equal to or greater than the quality threshold, a micro-weather report may be generated. The micro-weather report may be presented to a user. For example, the weather conditions at the 10th floor of Building X facing north may be reported as follows: 1) wind speeds is about 22-25 miles per hour "mph," 2), wind direction is north ("N") to north west ("NW"), precipitation (e.g., none), and the temperature is 64F (Fahrenheit).

In an additional embodiment, the UAS mission routing may be based on derived micro-weather reporting. The micro-weather reporting data may be used to derive mission routing for UAS missions, enable route planning to minimize time, and/or optimizing fuel efficiency while avoiding routes with poor weather conditions. For example, consider a drone delivery system of FIG. 6, following.

Figure 6:
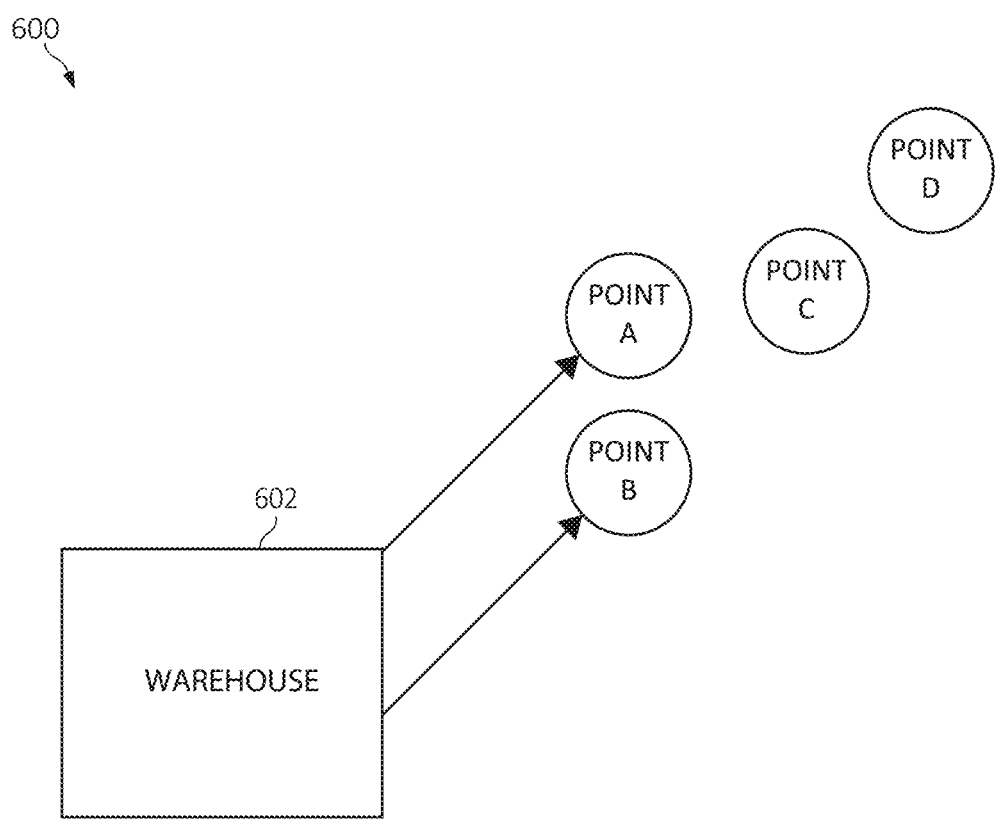
FIG. 6 a block diagram of a system for routing unmanned aerial system (UAS) missions based upon derived micro-weather reporting according to an embodiment of the present invention.

FIG. 6 illustrates a central warehouse 602 having one or more points for different routes that may be the same so only minor gaps may be required to be filled in for a new route. The computer system 12 of FIG. 4 may gather the micro-weather condition data on an entire route and provide data for route optimization operations. For example, as illustrated in FIG. 6, assume current data for routes to Point A and Point B have already been collected. Thus, the central warehouse 602 may retrieve the micro-weather data for the route from the central warehouse 602 to Point C and Point D as Point C and Point D share most of the path to Point B.

Figure 7:
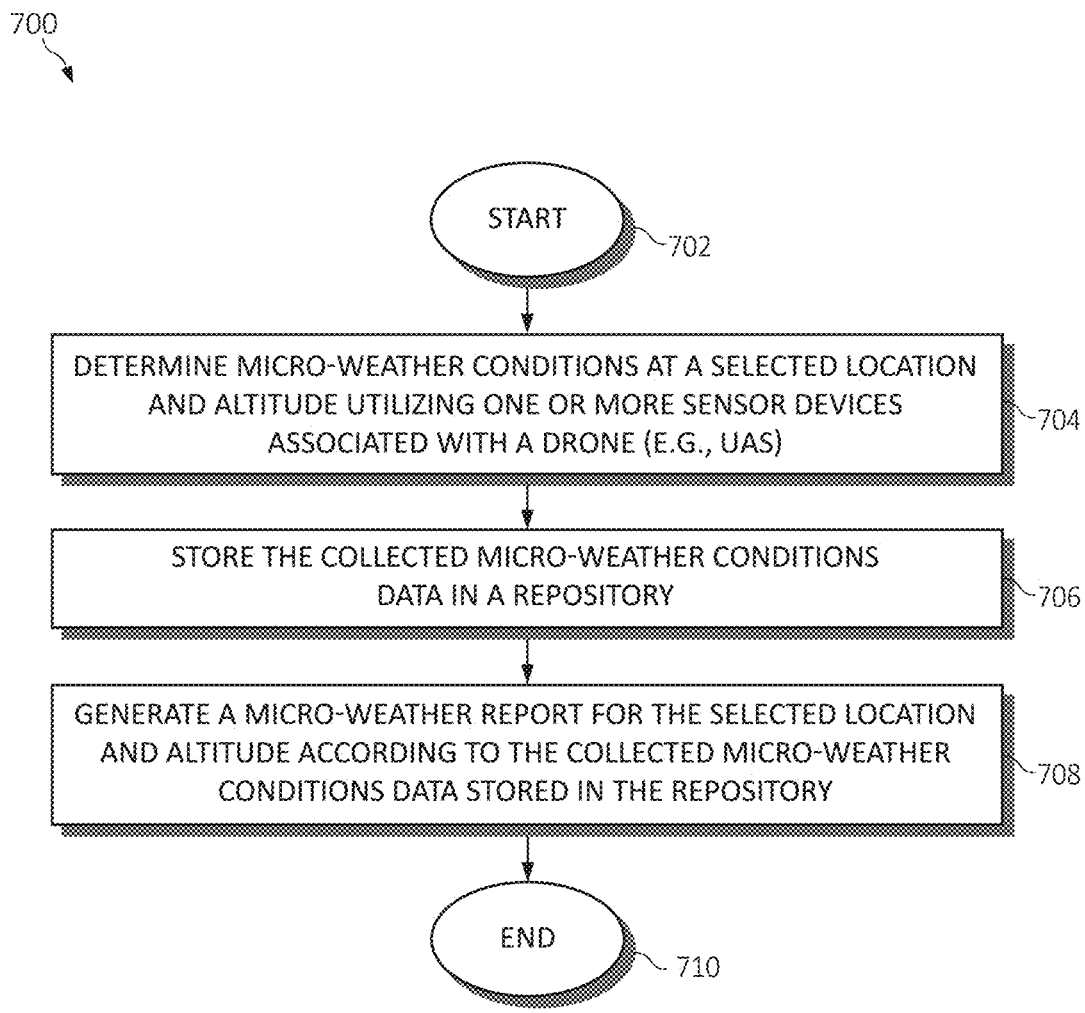
FIG. 7 is a flowchart diagram depicting an exemplary method for capturing a micro-weather report by unmanned aerial system (UAS) deployment at selected locations and altitudes in which various aspects of the present invention may be implemented.

FIG. 7 is a flowchart diagram depicting an additional exemplary method for capturing a micro-weather report by UAS deployment at selected locations and altitudes by a processor. The functionality 700 may be implemented as a method executed as instructions on a machine, where the instructions are included on at least one computer readable medium or one non-transitory machine-readable storage medium. The functionality 700 may start in block 702.

Micro-weather conditions at a selected location and altitude may be determined utilizing one or more sensor devices associated with a drone (e.g., a UAS), as in block 704. The collected micro-weather conditions data may be stored in a repository, as in block 706 A micro-weather report may be generated for the selected location and altitude according to the collected micro-weather conditions data stored in the repository, as in block 708. The functionality 700 may end, as in block 710.

In one aspect, in conjunction with and/or as part of at least one block of FIG. 7, the operations of method 700 may include each of the following. The operations of method 700 may dispatch one or more drones to the selected location and altitude for determining micro-weather conditions upon a quality level of current weather data being less than a defined quality level threshold. Data relating to the micro-weather conditions may be collected using the one or more sensor devices associated with the drone.

The operations of method 700 may schedule the drone to operate in the selected location and altitude. The operations of method 700 may redirect one or more drones to operate in the selected location and altitude. Also, the collecting and/or determining the micro-weather conditions utilizing the one or more sensor devices associated with the drones may before, during, and/or after the scheduling and/or redirecting the drone to operate in the selected location and altitude. The operations of method 700 may determine the micro-weather conditions utilizing the one or more sensor devices associated with the UAS occurs while the drone is traveling or within the selected location and altitude.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for using an unmanned aerial system (UAS), comprising:
receiving a micro-weather report request, from a user via a network, for current weather information with respect to micro-weather conditions at a selected location and altitude;
analyzing an amount and quality of weather data available at the selected location and altitude to determine whether the amount and quality of the weather data available at the selected location and altitude is sufficient to respond to the request for the current weather information requested by the user based on a comparison of the weather data to a computed quality threshold, wherein the computed quality threshold is based on a number of captured weather reports by the UAS within a specified time period;
responsive to determining the available weather data is not sufficient to respond to the request based on the weather data being below the computed quality threshold, dispatching the UAS to the selected location and altitude, wherein dispatching the UAS includes:
responsive to determining the UAS is a manually-controlled UAS operated by a human user, detecting the UAS is traveling, within a predetermined vicinity of the selected location and altitude, wherein the manually-operated UAS is identified as being registered with a UAS traffic management repository having registered a plurality of UAS owned and operated by respective independent operators,
responsive to the detecting, transmitting a request to an operator of the UAS to travel to the selected location and altitude to determine the micro-weather conditions,
responsive to the operator accepting the request, redirecting, from a travel path of the current mission, the UAS to operate at the selected location and altitude,
responsive to determining the UAS is an autonomously-controlled UAS, identifying the UAS will execute a pre-programmed mission in which the UAS travels within the predetermined vicinity of the selected location and altitude, responsive to the identifying, transmitting a request to the UAS to travel to the selected location and altitude to determine the micro-weather conditions, and responsive to the UAS accepting the request, modifying the pre-programmed mission to detour the UAS to operate at the selected location and altitude; and determining the micro-weather conditions at the selected location and altitude utilizing a plurality of sensor devices associated with the dispatched UAS, wherein at least a first of the plurality of sensor devices obtains actual weather measurements associated with the micro-weather conditions and at least a second of the plurality of sensor devices, having primary functionality not explicitly related to obtaining weather measurements notwithstanding related to a flight of the UAS, obtains information used to deduce the micro-weather conditions.

2. The method of claim 1, further including collecting data relating to the micro-weather conditions using the plurality of sensor devices associated with the UAS, wherein the data includes the actual weather measurements and the information.

3. The method of claim 2, further including:
storing the collected data in a repository; and
generating a micro-weather report according to the collected data stored in the repository.

4. The method of claim 1, further including scheduling the UAS to operate in the selected location and altitude, wherein the determining of the micro-weather conditions utilizing the plurality of sensor devices associated with the UAS occurs after the scheduling of the UAS to operate in the selected location and altitude.

5. The method of claim 1, wherein the determining of the micro-weather conditions utilizing the plurality of sensor devices associated with the UAS occurs while the UAS is traveling within the selected location and altitude.

6. A system, using an unmanned aerial system (UAS) in a computing environment, comprising:
one or more processors with executable instructions that when executed cause the system to:
receive a micro-weather report request, from a user via a network, for current weather information with respect to micro-weather conditions at a selected location and altitude;
analyze an amount and quality of weather data available at the selected location and altitude to determine whether the amount and quality of the weather data available at the selected location and altitude is sufficient to respond to the request for the current weather information requested by the user based on a comparison of the weather data to a computed quality threshold, wherein the computed quality threshold is based on a number of captured weather reports by the UAS within a specified time period;
responsive to determining the available weather data is not sufficient to respond to the request based on the weather data being below the computed quality threshold, dispatch the UAS to the selected location and altitude, wherein dispatching the UAS includes:
responsive to determining the UAS is a manually-controlled UAS operated by a human user, detecting the UAS is traveling, within a predetermined vicinity of the selected location and altitude, and wherein the manually-operated UAS is identified as being registered with a UAS traffic management repository having registered a plurality of UAS owned and operated by respective independent operators,
responsive to the detecting, transmitting a request to an operator of the UAS to travel to the selected location and altitude to determine the micro-weather conditions,
responsive to the operator accepting the request, redirecting, from a travel path of the current mission, the UAS to operate at the selected location and altitude,
responsive to determining the UAS is an autonomously-controlled UAS, identifying the UAS will execute a pre-programmed mission in which the UAS travels within the predetermined vicinity of the selected location and altitude,
responsive to the identifying, transmitting a request to the UAS to travel to the selected location and altitude to determine the micro-weather conditions, and
responsive to the UAS accepting the request, modifying the pre-programmed mission to detour the UAS to operate at the selected location and altitude; and
determine the micro-weather conditions at the selected location and altitude utilizing a plurality of sensor devices associated with the dispatched UAS, wherein at least a first of the plurality of sensor devices obtains actual weather measurements associated with the micro-weather conditions and at least a second of the plurality of sensor devices, having primary functionality not explicitly related to obtaining weather measurements notwithstanding related to a flight of the UAS, obtains information used to deduce the micro-weather conditions.

7. The system of claim 6, wherein the executable instructions further collect data relating to the micro-weather conditions using the plurality of sensor devices associated with the UAS, wherein the data includes the actual weather measurements and the information.

8. The system of claim 7, wherein the executable instructions further:
store the collected data in a repository; and
generate a micro-weather report according to the collected data stored in the repository.

9. The system of claim 6, wherein the executable instructions further schedule the UAS to operate in the selected location and altitude, wherein the determining of the micro-weather conditions utilizing the plurality of sensor devices associated with the UAS occurs after the scheduling of the UAS to operate in the selected location and altitude.

10. The system of claim 6, wherein the executable instructions further determine the micro-weather conditions utilizing the plurality of sensor devices associated with the UAS occurring while the UAS is traveling within the selected location and altitude.

11. A computer program product for, by one or more processors, using an unmanned aerial system (UAS) in a computing environment, the computer program product comprising a non-transitory computer-readable storage medium having computer-readable program code portions stored therein, the computer-readable program code portions comprising:
an executable portion that receives a micro-weather report request, from a user via a network, for current weather information with respect to micro-weather conditions at a selected location and altitude;
an executable portion that analyzes an amount and quality of weather data available at the selected location and altitude to determine whether the amount and quality of the weather data available at the selected location and altitude is sufficient to respond to the request for the current weather information requested by the user based on a comparison of the weather data to a computed quality threshold, wherein the computed quality threshold is based on a number of captured weather reports by the UAS within a specified time period;
an executable portion that, responsive to determining the available weather data is not sufficient to respond to the request based on the weather data being below the computed quality threshold, dispatches the UAS to the selected location and altitude, wherein dispatching the UAS includes:
responsive to determining the UAS is a manually-controlled UAS operated by a human user, detecting the UAS is traveling, within a predetermined vicinity of the selected location and altitude, wherein the manually-operated UAS is identified as being registered with a UAS traffic management repository having registered a plurality of UAS owned and operated by respective independent operators, responsive to the detecting, transmitting a request to an operator of the UAS to travel to the selected location and altitude to determine the micro-weather conditions,
responsive to the operator accepting the request, redirecting, from a travel path of the current mission, the UAS to operate at the selected location and altitude, responsive to determining the UAS is an autonomously-controlled UAS, identifying the UAS will execute a pre-programmed mission in which the UAS travels within the predetermined vicinity of the selected location and altitude, responsive to the identifying, transmitting a request to the UAS to travel to the selected location and altitude to determine the micro-weather conditions, and responsive to the UAS accepting the request, modifying the pre-programmed mission to detour the UAS to operate at the selected location and altitude; and
an executable portion that determines the micro-weather conditions at the selected location and altitude utilizing a plurality of sensor devices associated with the dispatched UAS, wherein at least a first of the plurality of sensor devices obtains actual weather measurements associated with the micro-weather conditions and at least a second of the plurality of sensor devices, having primary functionality not explicitly related to obtaining weather measurements notwithstanding related to a flight of the UAS, obtains information used to deduce the micro-weather conditions.

12. The computer program product of claim 11, further including an executable portion that:
collects data relating to the micro-weather conditions using the plurality of sensor devices associated with the UAS, wherein the data includes the actual weather measurements and the information;
stores the collected data in a repository; and
generates a micro-weather report according to the collected data stored in the repository.

13. The computer program product of claim 11, further including an executable portion that schedules the UAS to operate in the selected location and altitude, wherein the determining of the micro-weather conditions utilizing the plurality of sensor devices associated with the UAS occurs after the scheduling of the UAS to operate in the selected location and altitude.

14. The computer program product of claim 11, further including an executable portion that determines the micro-weather conditions utilizing the plurality of sensor devices associated with the UAS occurring while the UAS is traveling within the selected location and altitude.

* * * * *